Patented Oct. 22, 1935

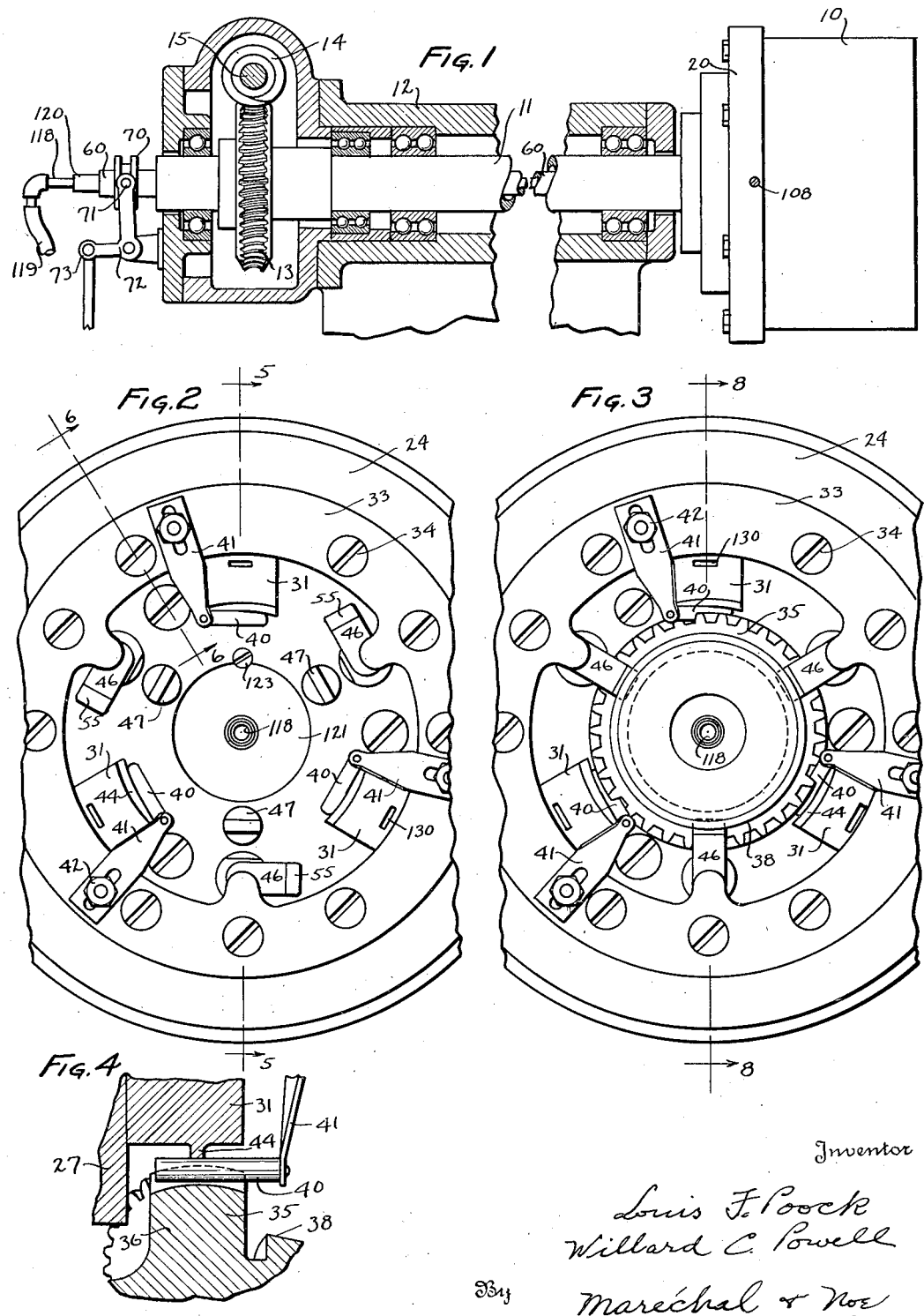

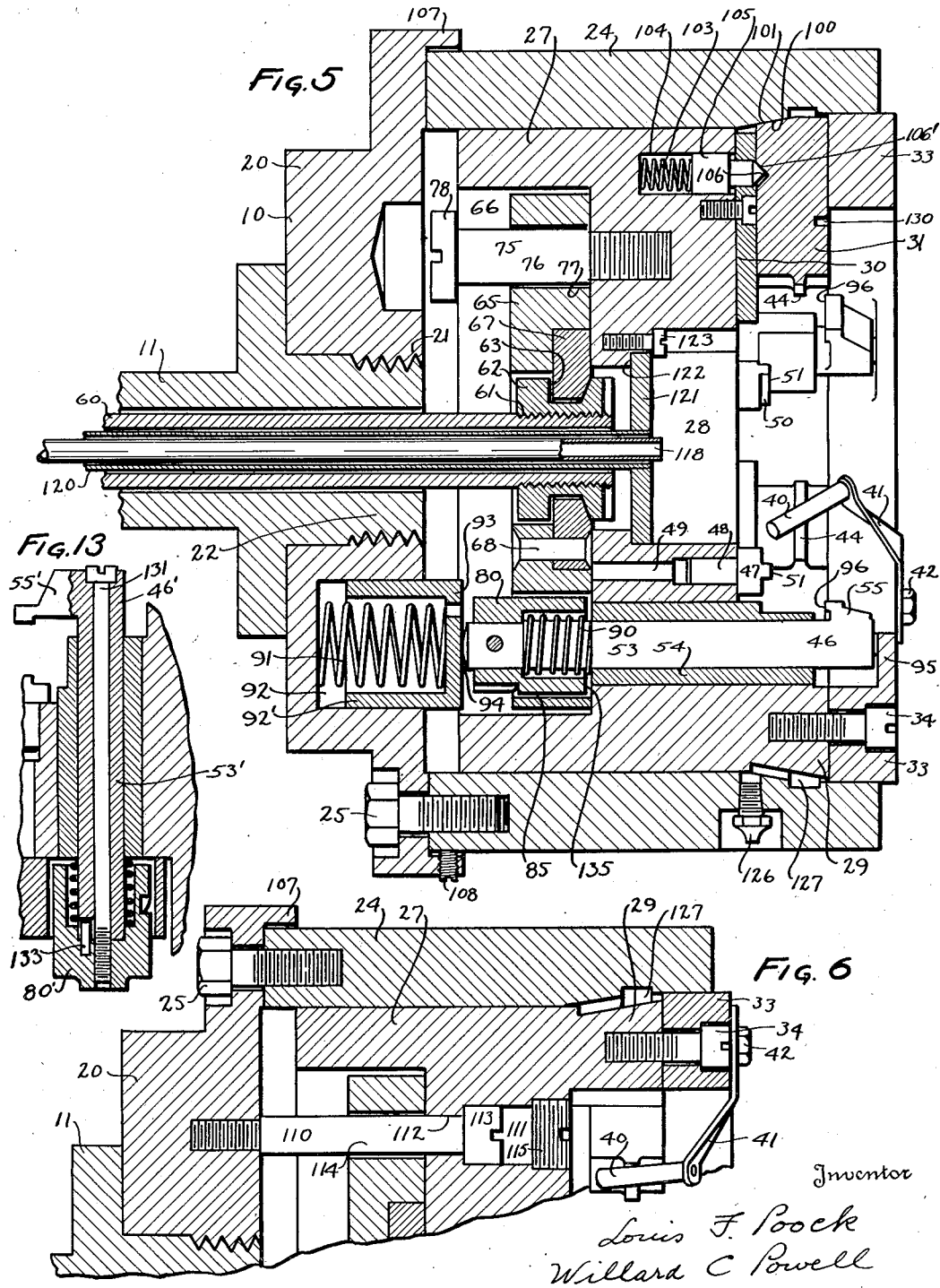

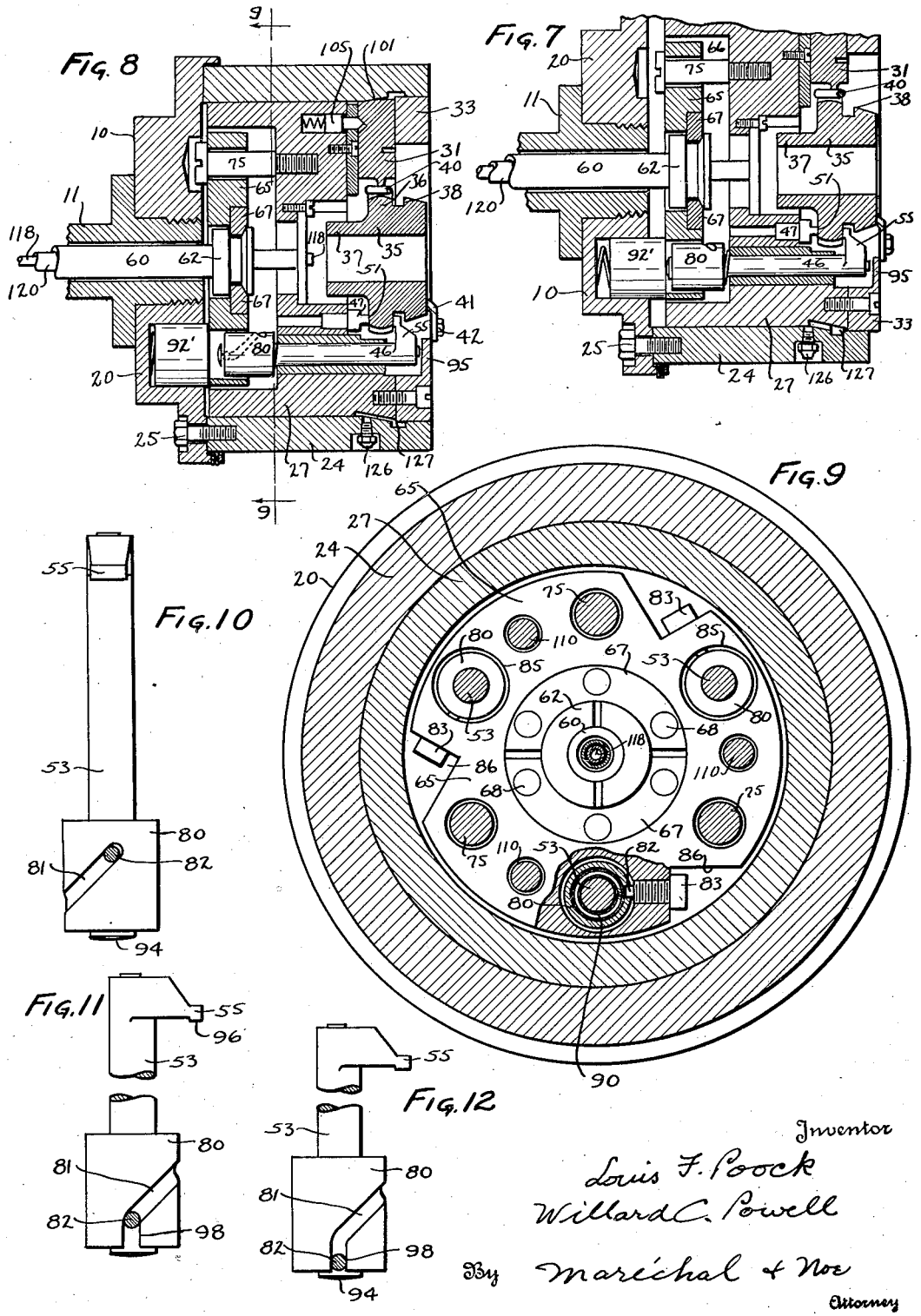

2,018,088

UNITED STATES PATENT OFFICE 2,018,088

MACHINE TOOL

Louis F. Poock and Willard C. Powell, Dayton, Ohio, assignors, by mesne assignments, to The Cimatool Company, Dayton, Ohio, a corporation of Ohio Application May 16, 1932, Serial No. 611,548

16 Claims. (Cl. 279—1)

This invention relates to chucks.

One of the principal objects of the invention is the provision of a chuck having provision for accurately clamping a work piece, and incorporating means for prepositioning the work piece in the chuck prior to the clamping of the work piece.

Another object of the invention is the provision of a chuck comprising axially movable holding means and radially movable clamping jaws that are actuated in sequence so that a work piece may be yieldingly held for accurate clamping engagement by the chuck jaws.

Another object of the invention is the provision in a chuck constructed to permit a fluid flow through the chuck to a work piece held thereby, and incorporating a tubular structure attached to the chuck to effectively seal the chuck interior against entrance of the fluid carried therethrough.

Other objects and advantages of the invention will be apparent from the following description, the accompanying drawings and the appended claims.

In the drawings, which disclose preferred embodiments of the invention,—

Fig. 1 is a side elevational view of a chuck constructed in accordance with the present invention; the chuck being shown in a position of use upon a rotating spindle;

Fig. 2 is a fragmentary plan view of the chuck with the parts shown in the disengaged or open position;

Fig. 3 is a view similar to Fig. 2 showing the chuck with a work piece clamped therein;

Fig. 4 is a fragmentary sectional detail taken on the axis of a clamping pin;

Fig. 5 is a sectional view taken on the line 5—5 of Fig. 2;

Fig. 6 is a sectional view taken on the line 6—6 of Fig. 2;

Fig. 7 is a sectional view generally similar to Fig. 5 showing the chuck in its movement toward engaging position;

Fig. 8 is a sectional view taken on the line 8—8 of Fig. 3;

Fig. 9 is a sectional view taken on the line 9—9 of Fig. 8;

Fig. 10 is a fragmentary detail of the holding member showing a positioning of parts corresponding to the chuck position illustrated in Figs. 2 and 5;

Fig. 11 is a view generally similar to Fig. 10 showing the parts in a position corresponding to Fig. 7;

Fig. 12 is a view generally similar to Fig. 10 showing the parts in a position corresponding to Fig. 8; and Fig. 13 is a sectional view showing a somewhat different form of holding member.

The drawings, in which like characters of reference designate like parts throughout the several views thereof, show a chuck 10 of a machine tool with the parts arranged to hold a work piece for a machining operation. In Fig. 1 the chuck 10 is shown mounted upon the rotatable spindle 11 of a machine tool 12. The spindle 11 carries a gear 13 which meshes with a gear 14 mounted on a shaft 15 that is attached to some suitable source of power for rotating the chuck. The chuck is constructed to resiliently grasp a work piece of any character, but herein shown as a helical gear, prior to engagement of the work piece by the chuck jaws in order to assure a proper positioning of the work piece by the jaws.

The chuck comprises generally a plate 20 having a threaded central bore 21 for attachment to the threaded end 22 of the spindle 11. A cylindrical sleeve 24 is attached to the front side of the plate 20 through provision of screws 25. This sleeve has slidably mounted within it the chuck body 27 which carries the work engaging parts of the chuck. The forward central portion of the chuck body is recessed at 28 to provide a clearance space for the reception of a work piece that is to be held by the chuck, and the forward rim portion of the body terminates in an annular extension 29 in which radially extending slots 30 are provided for readily removable work engaging jaws 31; of which three are shown. A ring 33 is attached to the end of the annular extension 29 of the chuck body by provision of screws 34. This closely held ring 33 serves as a closure for the open sides of the slots 30 and thus provides passages of rectangular cross section in which the chuck jaws 31 are adapted to slide radially to positions of engagement and disengagement with respect to the work piece which is shown at 35 in the form of a helical gear.

The gear 35, which is used to illustrate the chuck action, comprises a toothed disk-like portion 36 having a hub extension 37 at one side and an outwardly extending flange 38 at the opposite side. The gear is clamped by the chuck jaws through the medium of cylindrical pins 40 that are mounted upon yielding flat plates 41 adjustably held to the ring 33 by provision of clamping bolts 42 and are positioned one for each jaw. The pins, through the provision of the adjustable plate mounting, may be positioned so as to lie in the line of tooth cut of the gear, and are of such size as to engage adjacent teeth of the gear substantially on the pitch line. The inner or engaging end of each chuck jaw is formed as a narrow projection 44 having a semicircular machined face which is proportioned as to radius so as to stand concentrically with respect to the chuck axis when in engagement with the pins 40. Thus the three jaw faces stand as segments of a circle when in the position of engagement. Owing to the spiral form of tooth in a helical cut gear and the resulting angular positioning of the engaging pins 40 there can be substantially no more than a point contact at each of the three chuck jaws. Inasmuch as there is but a point contact, as contrasted to a line contact in the case of a straight cut spur gear, there is thus no provision in the clamping engagement of the radially movable jaws on a helical cut gear for insuring a proper positioning of the gear within the chuck whereby the gear axis will stand coaxially with the chuck.

In order to provide an assured proper positioning of a work piece the chuck is provided with a holding mechanism which resiliently engages the work piece and properly positions it within the chuck prior to engagement of the jaws. This holding mechanism comprises axially movable members which, during engaging action of the chuck, serve to pull the work piece axially into engagement with the faces of accurately positioned stop members so that the work piece is properly held for engagement by the jaws.

The fixed stop members of the holding mechanism are studs 47 which are formed with cylindrical extensions 48 that are held within holes 49 in the chuck body 27. The stop members have projecting ends 50 that are accurately machined on their outer faces 51 so that when the stop members are placed within the chuck body the faces 51 provide an accurately positioned surface for engagement by a face on the work piece to accurately position the work piece axis parallel with respect to the chuck axis. The work piece is held against the stop faces 51 through the provision of holding members 46 which, during the operation of the chuck are adapted to move angularly into an overlying position with respect to the work piece and then axially into engagement with the work piece to hold it against the stop faces 51. As shown, the holding members 46 comprise cylindrical stem portions 53 that stand parallel with the chuck axis and are slidably mounted within bushings 54 carried within the chuck body 27. The outward end of the holding members 46 are provided with perpendicularly extending hooks or fingers 55 which are adapted to engage the opposite face of the gear from that which is held against the stop faces 51.

The stop members 47 and holding members 46 are arranged in pairs about the chuck intermediate the chuck jaws. As shown, there are three pairs of stop members and holding members. To permit entrance and withdrawal of the work piece from the chuck the holding members 46 are provided with an operating mechanism whereby the fingers 55 may move angularly about the axes of the holding members from a position of clearance for the work piece to a position in which each finger overlies the gear and stands axially aligned with its cooperating stop face 51.

Although the chuck may be constructed so that the holding mechanism and clamping jaws will be operated independently it is preferably arranged so that these parts are operated from one source so that the movement of the holding members 46 and the clamping jaws 31 is coordinated. As illustrated, the fingers 55 stand in the clearance position for the gear when the chuck is in disengaged position. When it is desired to clamp a gear the chuck mechanism is actuated whereupon the fingers first move angularly into the overlying positions, then move axially into holding engagement with the gear, after which the jaws move radially into clamping position.

The chuck is operated through the provision of an axially movable tube 60 which is mounted within the chuck spindle 11. The inner end of the operating tube is threaded at 61 for reception of a nut 62 which is provided with an annular slot 63. An axially movable operating member in the form of a disk 65, which stands within a clearance space 66 at the rear side of the chuck body 27, is operably attached to the tube nut 63 by provision of two semicircular ring-like members 67 that are securely fastened to the disk 65 by provision of rivets 68 and are a loose fit within the groove 63 of the tube nut. The chuck holding fingers and jaws are actuated by axial movement of the chuck disk 65, and this is effected by moving the tube 60 from a suitable operating mechanism attached thereto. As shown in Fig. 1, the outer end of the tube 60 is provided with a collar 70 which is engaged by the fingers 71 of a shifting fork 72 having a crank arm 73 that is connected to some suitable mechanism such, for example, as a hydraulic cylinder or a manually operated lever that can be actuated by the chuck operator.

In order to provide for the proper sequence of movement of the chuck parts between engaging and disengaging positions the disk 65 is attached to the chuck body 27 through a lost motion connection whereby the disk may move relatively with respect to the body. As shown, spaced shoulder screws 75 threadedly engage the chuck body 27 and project from the rear face thereof into the clearance space 66 within which the disk 65 stands. These screws 75 have stem portions 76 which project through openings 77 in the disk 65 and are a loose fit therein. The stem portions of the screws are considerably longer than the width of the disk 65 so that the disk is permitted a certain amount of free movement on the screw stems without causing movement of the chuck body 27. As shown, the disk may move independently of the chuck body from the position shown in Fig. 5 wherein the disk and chuck body lie in contact, to the position of Fig. 7 wherein the heads 78 of the screws 75 and the disk 65 are in contact. The holding members 46 are actuated during this free movement of the chuck disk.

In order to provide the angular movement necessary to move the fingers of the holding members between clearance and engaging positions, the holding members are provided with a spiral slot and pin connection with the disk 65. As shown, the inner end of each member 46 has attached to it a sleeve-like member 80 which has formed on its external cylindrical surface a spiral slot 81 which is engaged by the end 82 of a screw 83 that is carried by the disk 65. The disk 65 is constructed with cylindrical clearance passages 85 for the sleeves 80, and the screws 83 project inwardly from notched portions 86 on the disk so that they stand perpendicularly with respect to the axes of the holding members. Upon actuation of the operating tube 60 to move the disk 65 from the position of Fig. 5 to the position of Fig. 7 the pins 82 are caused to traverse the spiral extent of the slots 81 to thereby move the clamping fingers 46 angularly into the overlying position as is shown in Fig. 3.

A spring 90 is positioned within each sleeve 80 and tends to force its holding member axially towards holding position. The force of the springs 90 is resisted by other springs 91 which are carried within cylindrical sockets 92 of the chuck plate 20, and which bear against sleeve-like caps 92' having flat faces 93 that are adapted to engage the ends 94 of the holding members 46. During times that the disk 65 is in its forward position, corresponding to the disengaged position of the chuck, the springs 91 are free to act on the members 46 and, as these springs are heavier than the springs 90, they tend to overcome the force of the springs 90 and urge the holding members outwardly. This outward movement of the members 46 is limited by the provision of lugs 95 which are formed as projections on the ring 33 and overlie the ends of the members 46. The positioning of the lugs 95 is such that under the urge of the springs 91 the holding members are moved axially with respect to the chuck body to an outward position limited by the lugs 95 wherein the work engaging faces 96 of the fingers 55 are spaced axially from the stop faces 51 by a distance greater than the thickness of the work piece to be held therebetween. By providing such a clearance between the faces 51 and 96 the manual insertion of a work piece within the chuck and the initial movement of the holding members is facilitated.

The force of the springs 91 continues to be exerted against the members 46 during the angular movement of the fingers 55 so that these fingers are moved into overlying position while still spaced apart a distance greater than the gear width. The spacing of the chuck parts is such that when the fingers have completed their angular movement the disk 65, upon further movement, will engage the faces 93 of the members 92 to compress the springs 91 and move them out of engagement with the ends of the holding members. This permits the springs 90 to act and move the holding members and fingers axially into engagement with the work piece. To permit movement of the disk 65 beyond that required to cause the radial movement of the members 46 the slots 81 terminate in portions that are parallel with the axes of the members 46. This portion of the slots, indicated at 98, permits relative axial movement between the disk 65 and members 46 so that upon additional movement of the part 65 each member 46 is then tensioned by its spring 90.

A slight amount of movement of the disk 65 beyond that required to move the faces 93 into clearance position brings the disk 65 into contact with the screw heads 78 whereupon additional movement causes a like movement in the chuck body 27. The chuck jaws are actuated during this last portion of the movement of the disk 65. As shown, the outer ends 100 of the jaws 31 are beveled and engage a conical or tapering face 101 formed on the inner side of the sleeve 24. As mentioned before, the jaws 31 are held between the body 27 and ring 33 and are free to move radially in the rectangular passages formed by these two parts. The jaws 31 are urged outwardly toward disengaged position by springs 103 which are positioned within cylindrical sockets 104 formed in the chuck body 27.

The springs 103 bear against studs 105 which are formed with conical ends 106 that engage V-shaped slots 106' on the rear face of each jaw 31. These parts are proportioned so that within the operating range of the chuck jaws the force of the spring is exerted on that side of each V-shaped groove which tends to force the jaw outwardly. Upon moving the disk 65 an additional amount after engagement with the screw heads 78 causes the chuck body to move axially with respect to the sleeve 24 so that the jaws 31 are caused to climb the taper 101 and are thus moved inwardly. The movement of the jaws from disengaged to engaged position is shown in Figs. 5 and 8.

The holding members 46 engage the work piece under tension of the springs 90 consequently they exert a yielding pressure which permits the work piece, while held against the accurately positioned stop faces 51, to be moved bodily by the engaging chuck jaws. As the faces stand in accurate perpendicular alignment with the chuck axis and the jaw faces are accurately machined to concentricity with respect to the chuck axis the work piece is properly held therein.

Forward movement of the chuck body 27 to disengaged position is limited by the provision of shoulder screws 110 which threadedly engage the plate 20 and extend perpendicularly therefrom through holes provided in the chuck body. These screws are assembled in place by insertion through the holes 111 which have a stepped portion of sufficient diameter to provide clearance for the screw heads 113. A reduced portion 112 of the holes 111 is a sliding fit on the screw body 114. The outward movement of the chuck body is limited by the length of the screw stem and is stopped by engagement of the screw head and the shoulder at the reduced part of the hole 111. Each opening 112 is sealed by provision of a threaded plug 115.

In order to provide an initial concentric setting for the chuck the plate 20 is formed with an extending annular rim 107 of such internal diameter that a clearance space is provided between the inner face of this flange 107 and the outer diameter of the sleeve 24. Set screws 108 are provided in the rim for engagement with the outer face of the sleeve 24 and, by adjusting these set screws, the axis of the chuck sleeve and parts carried thereby is moved relatively to the spindle axis. Upon adjusting the chuck sleeve to a position wherein it stands concentrically with respect to the axis of rotation the screws 25 are then drawn tight.

A flow of water or some suitable lubricant for proper operation of the tool during the machining of the work piece is afforded through provision of a tube 118 which terminates at its inner end within the space 28 of the chuck body and at its outer end is connected to some suitable source of fluid supply as is indicated at 119. The chuck interior is effectively sealed against the entrance of this fluid or of any extraneous matter that might eventually interfere with the operation of the chuck. As shown, an enclosing tube 120 surrounds the fluid carrying tube 118 and extends for substantially the length of the tube 118. The inner end of this enclosing tube 120 is sealed to a cylindrical disk 121 which is a fluid tight fit within a recess 122 formed in the chuck body. The disk 121 is held against displacement by provision of a screw 123. The outer end of this tube 120 extends beyond the outer end of the operating tube 60 as is shown in Fig. 1 so that fluid carried along the outer surface of the tube 118 is effectively prevented from entering the operating part of the chuck.

The chuck jaws are closely held within the slots 30 in which they slide and these slot openings, as well as the clearance space between the fixed sleeve 24 and axially movable ring 33, is effectively closed against the entrance of fluid or grit through the provision of a grease seal. As shown, the sleeve 24 carries a lubricating fitting 126 which opens into an annular space 127 adjacent the outer ends of the jaws 31 and the annular clearance space between the parts 24 and 33. By applying grease under pressure to this fitting to fill the annular slot 127 and the relatively movable chuck parts the normally close clearance of the relatively movable parts is effectively sealed.

Although these chucks are intended primarily for use in production work wherein a single size of work piece is run continuously in the chuck for long periods so that there is no need for provision in the chuck construction to accommodate work pieces of different sizes, the chuck is so constructed that it can readily be changed to accommodate a variety of sizes of work pieces. Such change necessitates replacement of the jaws 31 and of the holding members 46, and requires adjustment of the pins 40. To make this change the pins 40 are readily removed by taking off the nuts 42. The jaws 31 are replaced by moving them inwardly an amount sufficient to permit them to be taken out of the chuck. This is accomplished by inserting the end of a screw driver in the slot 130 provided in each jaw 31 and pulling the jaw inwardly against the tension of the spring 103 until it can be lifted from the chuck. Other jaws are then inserted having a clamping circle of proper diameter. Through the provision of a holding member construction such as is shown in Fig. 13 the holding members can be readily replaced so as to provide a proper spacing between the stop faces 51 and the fingers 55. As shown in Fig. 13, the holding member 46' is constructed with the stem portion 53' and the sleeve 80' as separate parts joined together by a screw 131 having a head portion 132 that is accessible from the outer end of the chuck upon removing the chuck ring 33. The parts 53' and 80' are held in fixed relationship through the provision of a pin 133 so that upon assembling a member 46' of suitable length the pin will serve to operate the finger 55' in accordance with the movement of the sleeve 80'.

The provision of the inwardly extending lugs 95 on the chuck ring 33 which serve to limit the outward travel of the clamping fingers 46 is necessary only when operating on a work piece having a construction such as that shown wherein an overlying flange 38 permits but a narrow range of axial movement for the holding members. In this illustrated example of the chuck a gear of this character has been used to illustrate that the movement of the clamping fingers can be accurately controlled so that they will describe a path of movement within close limits. On a gear without this overhanging flange, or an obstruction of generally similar character, the lugs 95 can be dispensed with whereupon the outward axial movement of the clamping fingers can then be limited by engagement of the forward face 135 of the sleeve 80 with the rear face of the chuck body 27.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a chuck, a chuck body, stop means thereon adapted for positioning a work piece, means for holding the work piece against said stop means, jaws movable to clamp the work piece, jaw operating means, means on the jaw operating means for moving the holding means toward holding position, and means independent of the jaw operating means for maintaining the holding means in holding position under tension.

2. In a chuck, movable members adapted to hold a work piece, means for moving said members from a position of clearance with respect to the work piece into overlying relationship therewith, and means operable independently of the first mentioned means for moving the members perpendicularly to the first mentioned movement into holding engagement with the work piece while in overlying relationship thereto.

3. In a chuck, movable members adapted to hold a work piece, means for moving said members from a position of clearance with respect to the work piece into overlying relationship therewith, and means rendered effective by movement of the first mentioned means and operable independently thereof for moving the members perpendicularly to the first mentioned movement into yielding engagement with the work piece while in overlying relationship thereto.

4. In a chuck, movable members adapted to hold a work piece, said movable members having spiral grooves formed therein, a movable operating member, pins in said operating member engaging said spiral grooves, and means for moving the operating member to move the holding members into a position of engagement with the work piece.

5. In a chuck, stop means presenting a work engaging face perpendicularly related to the chuck axis, axially movable work engaging members adapted to yieldingly hold a work piece, chuck jaws radially movable to clamping engagement with the work piece, and means for moving said holding members and jaws in succession into maintained engagement with the work piece.

6. In a chuck, movable members adapted to yieldingly hold a work piece, chuck jaws movable to clamping engagement with the work piece, and means for moving said holding members and jaws in succession into maintained engagement.

7. In a chuck, holding members movable to holding engagement with a work piece, chuck jaws movable to clamping engagement with the work piece, means for moving said holding members into holding position and then moving said jaws into clamping engagement, and means rendered operable by the moving means during movement of the holding members into holding position to yieldingly hold the holding members in engagement with the work piece.

8. In a chuck, members adapted to hold a work piece and pivotally movable to a position overlying said work piece, clamping jaws, means to pivotally move the holding members into overlying position and to clamp the jaws upon the work piece, and means operable independently of the first mentioned means and effective after pivotal movement of the holding members to slidably move the holding members into engagement with the work piece.

9. In a chuck, a holding member movable to yieldingly engage a work piece, means resiliently urging said holding member toward a released position, means resiliently urging said holding means in the opposite direction toward an engaging position, and means to move the holding means toward engaging position and to overcome the action of the first mentioned resilient means for movement of the holding means to engaging position under urge of the second mentioned resilient means.

10. In a chuck, a holding member movable on a pivot axis and adapted to yieldingly engage a work piece, means resiliently urging said holding member toward a released position, resilient means urging said holding member in the opposite direction towards the position of engagement with the work piece, and means to rotatably move the holding member on the pivot axis toward a position of engagement with the work piece and to overcome the resilient means acting in a release direction for movement of the holding means into engagement with the work piece under urge of the resilient means acting toward the engaging position.

11. In a chuck, an axially movable chuck part, chuck jaws adapted to clamp a work piece and mounted on said chuck part for radial movement with respect to the chuck axis, movable holding members mounted on the chuck part and adapted to yieldingly hold a work piece, and an axially movable member for controlling movement of the holding members and for moving said chuck part to positively actuate the jaws.

12. In a chuck, a movable chuck part, clamping jaws mounted thereon and movable relatively thereto, means for moving the jaws upon movement of the chuck part, holding members mounted in the chuck part and adapted to yieldingly hold a work piece, and an operating member for the jaws and holding members, said operating member moving relatively to the chuck part for actuation of the holding members and moving with the chuck part for positive actuation of the chuck jaws.

13. A chuck comprising work holding means pivotally movable to a position overlying a work piece and axially movable into engagement therewith, clamping jaws movable to work clamping position, and operating means therefore for controlling the pivotal movement of the holding means, the axial movement of the holding means, and the clamping movement of the jaws in the sequence named, said operating means acting directly on the clamping jaws in the clamping position.

14. In a chuck, means for yieldingly holding a work piece comprising a member pivotally and slidably movable into work engaging position, clamping jaws, operating means successively effective to pivotally move the holding member and subsequently clamp the jaws, resilient means to slidably move the holding means, and means actuated by the operating means intermediate the pivotal movement of the holding member and clamping of the jaws to render the resilient means effective to slidably move the holding means.

15. In a chuck, a work engaging member rotatably and axially movable on an axis parallel with the chuck axis, said member having a groove formed therein comprising a spiral portion and a portion extending axially of the member, a movable operating member, said operating member having a groove engaging pin, means for moving the operating member and pin in the direction of the chuck axis to turn the work engaging member, and means operable independently of the operating member to move the work engaging member axially during additional movement of the operating member wherein the pin moves in the axial portion of the groove.

16. In a chuck, a work engaging member rotatably and axially movable on an axis parallel to the chuck axis, said member having a groove formed therein comprising a spiral portion and a portion extending axially of the member, a movable operating member, said operating member having a groove engaging pin, means for moving the operating member and pin in the direction of the chuck axis to turn the work engaging member, means operable independently of the operating member to move the work engaging member axially during additional movement of the operating member wherein the pin moves in the axial portion of the groove, means constantly urging said work engaging member toward work engaging position, holding means effective on the work engaging member to resist axial movement toward engaging position, and means on the operating member to render said holding means ineffective during movement of the operating member pin in the axial portion of the groove.

LOUIS F. POOCK.
WILLARD C. POWELL.